(12) United States Patent
Liu

(10) Patent No.: US 11,457,437 B2
(45) Date of Patent: Sep. 27, 2022

(54) METHOD AND APPARATUS FOR CONFIGURING INFORMATION, BASE STATION AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 180 days.

(21) Appl. No.: 16/992,468

(22) Filed: Aug. 13, 2020

(65) Prior Publication Data

US 2020/0374847 A1  Nov. 26, 2020

Related U.S. Application Data

(63) Continuation of application No. PCT/CN2018/076715, filed on Feb. 13, 2018.

(51) Int. Cl.
*H04W 72/04* (2009.01)
*H04W 56/00* (2009.01)
*H04W 74/08* (2009.01)

(52) U.S. Cl.
CPC ......... *H04W 72/042* (2013.01); *H04W 56/00* (2013.01); *H04W 72/0453* (2013.01); *H04W 74/0833* (2013.01)

(58) Field of Classification Search
CPC ............... H04W 72/042; H04W 56/00; H04W 72/0453; H04W 74/7833
See application file for complete search history.

(56) References Cited

U.S. PATENT DOCUMENTS

2017/0366328 A1   12/2017   Seo et al.
2019/0068348 A1*  2/2019    Nam .................. H04L 5/0053
2019/0098590 A1*  3/2019    Nam .................. H04W 72/042

FOREIGN PATENT DOCUMENTS

WO     2016099196 A1   6/2016

OTHER PUBLICATIONS

International Search Report issued in Application No. PCT/CN2018/076715 dated Nov. 1, 2018, (4p).

(Continued)

*Primary Examiner* — Brenda H Pham
(74) *Attorney, Agent, or Firm* — Arch & Lake LLP

(57) ABSTRACT

A method of configuring information includes: generating first configuration information to be configured in a radio resource control (RRC) signaling, where the first configuration information indicates, for a bandwidth part (BWP), a relative position from a frequency-domain starting position of an SSB corresponding to the BWP to a frequency-domain starting position of the BWP; generating second configuration information for index information in a physical broadcast channel (PBCH) of the SSB in the BWP, where the second configuration information includes a timing pattern, half-frame indication information, and configuration information on RMSI PDCCH for the SSB, and the half-frame indication information indicates an identifier of a half-frame of a current radio frame in which the SSB is located; and sending the first configuration information and the second configuration information to user equipment (UE) through the RRC signaling.

17 Claims, 13 Drawing Sheets

(56) References Cited

OTHER PUBLICATIONS

Catt "Offline summary for AI 7.1.2.2 Remaining details on Remaining Minimum System Information", 3GPP TSG RAN WG1 Meeting 90bis,Prague, CZ, R1-1718772, Oct. 9-13, 2017, (14p).
Intel Corporation, "Details on NR PBCH design", 3GPP TSG RAN WG1 Meeting RAN1 #89, Hangzhou, P.R. China, R1-1707339, May 15-19, 2017, (8p).

* cited by examiner

METHOD AND APPARATUS FOR CONFIGURING INFORMATION, BASE STATION AND USER EQUIPMENT

CROSS-REFERENCE TO RELATED APPLICATION

This application is a continuation application of International Application No. PCT/CN2018/076715, filed on Feb. 13, 2018, the disclosure of which is hereby incorporated by reference in its entirety for all purposes.

TECHNICAL FIELD

The present disclosure relates to the field of communication technology, and in particular, relates to a method and an apparatus for configuring information, a method and an apparatus for acquiring a common control resource set of remaining minimum system information, a base station, user equipment, and a computer-readable storage medium.

BACKGROUND

With the rapid development of wireless communication technology, the fifth-generation mobile communication technology (5th Generation, referred to as 5G) has emerged. In a recent 3rd Generation Partnership Project (3GPP) protocol, a bandwidth part (BWP) which User Equipment (UE) is working within is called a current BWP, and another BWP can be assigned to the UE by a base station. In response to being assigned with another BWP, the UE can acquire a common control resource set (CORESET) of remaining minimum system information (RMSI) for the new active BWP by searching a synchronization broadcast block (SSB), however, which will cause a time delay.

SUMMARY

In view of this, the present application discloses a method and an apparatus for configuring information, a method and an apparatus for acquiring a CORESET of RMSI, a base station, user equipment, and a computer-readable storage medium, so as to reduce a time delay caused by acquiring a CORESET of RMSI for a new active BWP.

According to a first aspect of the present disclosure, there is provided a method of configuring information, which is applicable to a base station, and the method includes: generating first configuration information to be configured in a radio resource control (RRC) signaling, where the first configuration information indicates, for each bandwidth part (BWP), a relative position from a frequency-domain starting position of a synchronization broadcast block (SSB) corresponding to the BWP to a frequency-domain starting position of the BWP; generating second configuration information for index information in a physical broadcast channel (PBCH) of each SSB, where the second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located; and sending the first configuration information and the second configuration information to user equipment (UE) through the RRC signaling.

According to a second aspect of the present disclosure, there is provided a method of acquiring a common control resource set (CORESET) of remaining minimum system information (RMSI), which is applicable to user equipment (UE), and the method includes: receiving first configuration information and second configuration information sent by a base station, where the first configuration information is configured in a radio resource control (RRC) signaling and indicates, for each bandwidth part (BWP), a relative position from a frequency-domain starting position of synchronization broadcast block (SSB) corresponding to the BWP to a frequency-domain starting position of the BWP, and the second configuration information is generated for index information in a physical broadcast channel (PBCH) of each SSB, in which the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located; acquiring a synchronization signal of an SSB corresponding to a new active BWP based on the first configuration information, the second configuration information, an acquired identifier of the new active BWP, and the frequency-domain starting position of the new active BWP carried in the RRC signaling; skipping a reading to the PBCH of the SSB corresponding to the new active BWP; obtaining a time-frequency position of the SSB corresponding to the new active BWP based on the configuration information on the RMSI PDCCH corresponding to the new active BWP carried in the RRC signaling and the synchronization signal of the SSB corresponding to the new active BWP; and calculating a position of CORESET of RMSI for the new active BWP based on the time-frequency position of the SSB corresponding to the new active BWP, and acquiring the CORESET of RMSI for the new active BWP based on the position of the CORESET of RMSI.

According to a third aspect of the present disclosure, there is provided an apparatus for configuring information, which is applicable to a base station, and the apparatus includes: a first generating module configured to generate first configuration information to be configured in a radio resource control (RRC) signaling, where the first configuration information indicates, for each bandwidth part (BWP), a relative position from a frequency-domain starting position of a synchronization broadcast block (SSB) corresponding to the BWP to a frequency-domain starting position of the BWP; a second generating module configured to generate second configuration information for index information in a physical broadcast channel (PBCH) of each SSB, where the second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located; and a first sending module configured to send the first configuration information generated by the first generating module and the second configuration information generated by the second generating module to user equipment (UE) through the RRC signaling.

According to a fourth aspect of the present disclosure, there is provided an apparatus for acquiring a common control resource set (CORESET) of remaining minimum system information (RMSI), which is applicable to user equipment (UE), and the apparatus includes: a first receiving module configured to receive first configuration information and second configuration information sent by a base station, where the first configuration information is configured in a radio resource control (RRC) signaling and indicates, for each bandwidth part (BWP), a relative position from a frequency-domain starting position of a synchronization broadcast block (SSB) corresponding to the BWP to a frequency-domain starting position of the BWP, and the second configuration information is generated for index information in a physical broadcast channel (PBCH) of each SSB, in which the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located; an acquiring module configured to acquire a synchronization signal of an SSB corresponding to a new active BWP based on the first configuration information and the second configuration information which are received by the first receiving module, an acquired identifier of the new active BWP and the frequency-domain starting position of the new active BWP carried in the RRC signaling; a reading-skipping module configured to skip reading the PBCH of the SSB corresponding to the new active BWP; an obtaining module configured to obtain a time-frequency position of the SSB corresponding to the new active BWP based on the configuration information on the RMSI PDCCH corresponding to the new active BWP carried in the RRC signaling and the synchronization signal of the SSB corresponding to the new active BWP acquired by the acquiring module; and a calculating and acquiring module configured to calculate a position of the CORESET of RMSI for the new active BWP from the time-frequency position of the SSB corresponding to the new active BWP which is obtained by the obtaining module, and acquire the CORESET of RMSI for the new active BWP based on the position of the CORESET of RMSI.

According to a fifth aspect of the present disclosure, there is provided a base station including: a processor; and a memory for storing executable instructions by the processor. The processor is configured to: generate first configuration information to be configured in a radio resource control (RRC) signaling, where the first configuration information indicates, for each bandwidth part (BWP), a relative position from a frequency-domain starting position of a synchronization broadcast block (SSB) corresponding to the BWP to a frequency-domain starting position of the BWP; generate second configuration information for index information in a physical broadcast channel (PBCH) of each SSB, where the second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located; and send the first configuration information and the second configuration information to user equipment (UE) through the RRC signaling.

According to a sixth aspect of the present disclosure, there is provided user equipment, including: a processor; and a memory for storing executable instructions by the processor. The processor is configured to: receive first configuration information and second configuration information sent by a base station, where the first configuration information is configured in a radio resource control (RRC) signaling and indicates, for each bandwidth part (BWP), a relative position from a frequency-domain starting position of a synchronization broadcast block (SSB) corresponding to the BWP to a frequency-domain starting position of the BWP, and the second configuration information is generated for index information in a physical broadcast channel (PBCH) of each SSB, in which the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located; acquire a synchronization signal of an SSB corresponding to a new active BWP based on the first configuration information, the second configuration information, an acquired identifier of the new active BWP, and the frequency-domain starting position of the new active BWP carried in the RRC signaling; skip a reading to the PBCH of the SSB corresponding to the new active BWP; obtain a time-frequency position of the SSB corresponding to the new active BWP based on the configuration information on the RMSI PDCCH corresponding to the new active BWP carried in the RRC signaling and the synchronization signal of the SSB corresponding to the new active BWP; and calculate a position of CORESET of RMSI for the new active BWP from the time-frequency position of the SSB corresponding to the new active BWP, and acquire the CORESET of RMSI for the new active BWP based on the position of the CORESET of RMSI.

According to a seventh aspect of the present disclosure, there is provided a computer-readable storage medium having computer instructions stored thereon, where when the instructions are executed by a processor, the steps of the method of configuring information described above are performed.

According to an eighth aspect of the present disclosure, there is provided a computer-readable storage medium having computer instructions stored thereon, where when the instructions are executed by a processor, the steps of the method for acquiring a common control resource set (CORESET) of remaining minimum system information (RMSI) described above are performed.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate embodiments consistent with the present invention and, together with the description, serve to explain the principles of the present invention.

DETAILED DESCRIPTION OF THE EMBODIMENTS

Figure 1:
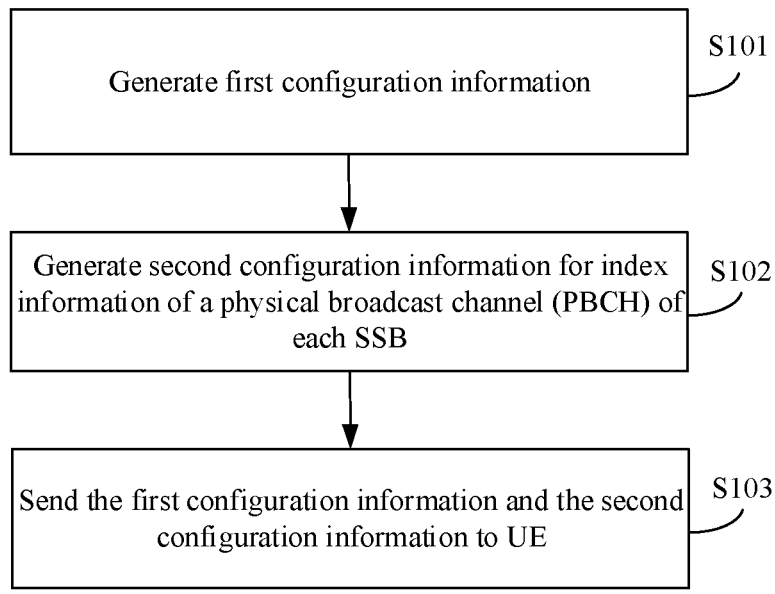
FIG. 1 is a flowchart illustrating a method of configuring information according to an exemplary embodiment of the present application.

Exemplary embodiments will be described in detail herein, with the illustrations thereof represented in the drawings. When the following descriptions involve the drawings, like numerals in different drawings refer to like or similar elements unless otherwise indicated. The implementations described in the following exemplary embodiments do not represent all implementations consistent with the present disclosure. Rather, they are merely examples of apparatuses and methods consistent with some aspects of the present disclosure as detailed in the appended claims.

FIG. 1 is a flowchart illustrating a method of configuring information according to an exemplary embodiment of the present application. This embodiment is described from a base station side. As shown in FIG. 1, the method of configuring information includes steps S101~S103.

At step S101, first configuration information is generated. The first configuration information is configured in a radio resource control (RRC) signaling and indicates, for each bandwidth part (BWP), a relative position from a frequency-domain starting position of an SSB corresponding to the BWP to a frequency-domain starting position of the BWP.

Here, SSB refers to a synchronization signal block or a physical broadcast channel block.

When a CORESET of RMSI for a BWP is not configured directly by the base station, the base station may generate the first configuration information, and the first configuration information is configured in an RRC signaling and indicates, for each BWP, a relative position from a frequency-domain starting position of an SSB corresponding to the BWP to a frequency-domain starting position of the BWP.

At step S102, second configuration information is generated for index information in a physical broadcast channel (PBCH) of each SSB. The second configuration information includes a timing pattern, half-frame indication information, and configuration information on RMSI PDCCH for the SSB, and the half-frame indication information indicates an identifier of a half-frame of a current radio frame in which the SSB is located.

Here, the first configuration information and the second configuration information may be configured into the same configuration information.

At step S103, the first configuration information and the second configuration information are sent to UE through the RRC signaling.

In the above embodiment, by generating and sending the first configuration information and the second configuration information to the UE, the UE is enabled to acquire a CORESET of RMSI for a new active BWP from information including the first configuration information and the second configuration information, without reading the physical broadcast channel (PBCH) of the SSB corresponding to the new active BWP, thereby reducing the time-delay caused by acquiring the CORESET of RMSI for the new active BWP.

Figure 2:
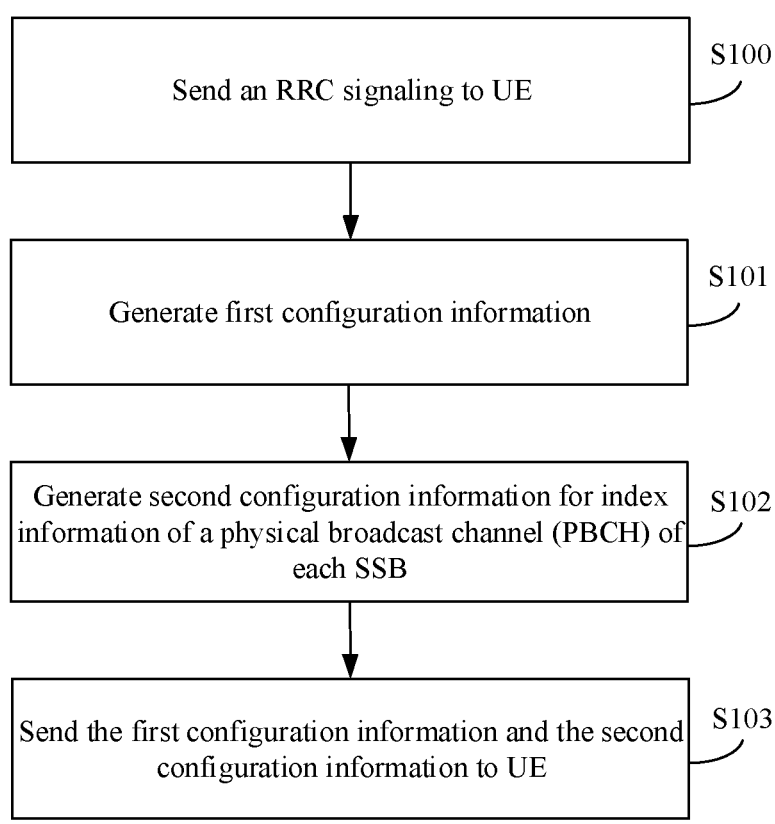
FIG. 2 is a flowchart illustrating another method of configuring information according to an exemplary embodiment of the present application.

FIG. 2 is a flowchart illustrating another method of configuring information according to an exemplary embodiment of the present application. As shown in FIG. 2, the method may further include step S100.

At step S100, an RRC signaling is sent to the UE. The RRC signaling carries the frequency-domain starting position of each BWP and the index information of each SSB which have been configured.

Here, there is no strict execution order among step S100 and the steps S101 to S103.

In the above embodiment, by sending the RRC signaling to the UE, the UE is enabled to acquire the CORESET of RMSI for the new active BWP based on the RRC signaling in combination with the first configuration information and the second configuration information.

Figure 3:
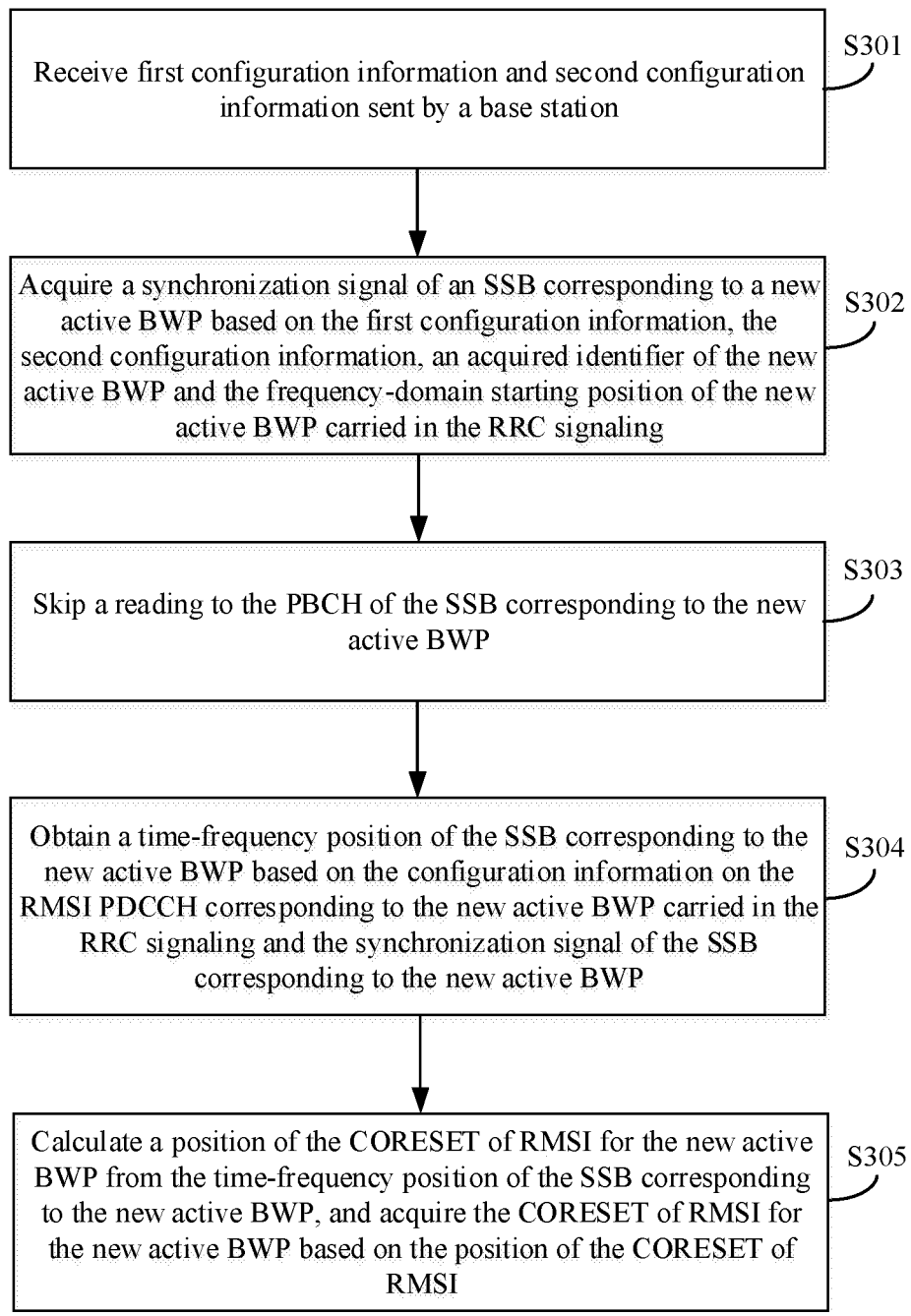
FIG. 3 is a flowchart illustrating a method for acquiring a CORESET of RMSI according to an exemplary embodiment of the present application.

FIG. 3 is a flowchart illustrating a method for acquiring a CORESET of RMSI according to an exemplary embodiment of the present application. This embodiment is described from a UE side. As shown in FIG. 3, the method for acquiring a CORESET of RMSI includes steps S301~S305.

At step S301, first configuration information and second configuration information sent by a base station are received. The first configuration information is configured in an RRC signaling and indicates, for each BWP, a relative position from a frequency-domain starting position of an SSB corresponding to the BWP to a frequency-domain starting position of the BWP. The second configuration information is generated for index information in a PBCH of each SSB, where the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located.

At step S302, based on the first configuration information, the second configuration information, an acquired identifier of a new active BWP and the frequency-domain starting position of the new active BWP carried in an RRC signaling, a synchronization signal of the SSB corresponding to the new active BWP is acquired.

Here, the UE may acquire the identifier of the new active BWP from a physical layer signaling.

In this embodiment, frequency-domain information on the SSB corresponding to the new active BWP may be acquired based on the first configuration information, the identifier of the new active BWP, and the frequency-domain starting position of the new active BWP; time-domain information on the SSB corresponding to the new active BWP may be acquired based on the second configuration information and the identifier of the new active BWP; and then the synchronization signal is obtained by searching the new active BWP based on the time-domain information and the frequency-domain information.

At step S303, a reading to the PBCH of the SSB corresponding to the new active BWP is skipped.

In this embodiment, the reading to the PBCH of the SSB corresponding to the new active BWP is skipped, that is, it is not necessary to read the PBCH of the SSB corresponding to the new active BWP, thereby reducing the time-delay caused by acquiring the CORESET of RMSI.

At step S304, a time-frequency position of the SSB corresponding to the new active BWP is obtained based on the configuration information on the RMSI PDCCH corresponding to the new active BWP carried in the RRC signaling and the synchronization signal of the SSB corresponding to the new active BWP.

At step S305, a position of the CORESET of RMSI for the new active BWP is calculated from the time-frequency position of the SSB corresponding to the new active BWP, and the CORESET of RMSI for the new active BWP is acquired based on the position of the CORESET of RMSI.

In the above embodiment, by receiving the first configuration information and the second configuration information sent by the base station, the synchronization signal of the SSB corresponding to the new active BWP may be acquired based on the first configuration information, the second configuration information, the acquired identifier of the new active BWP, and the frequency-domain starting position of the new active BWP carried in the RRC signaling, while the reading to the PBCH of the SSB corresponding to the new active BWP is skipped, that is, it is not necessary to read the PBCH of the SSB corresponding to the new active BWP, thereby reducing the time-delay caused by acquiring the CORESET of RMSI for the new active BWP.

Figure 4:
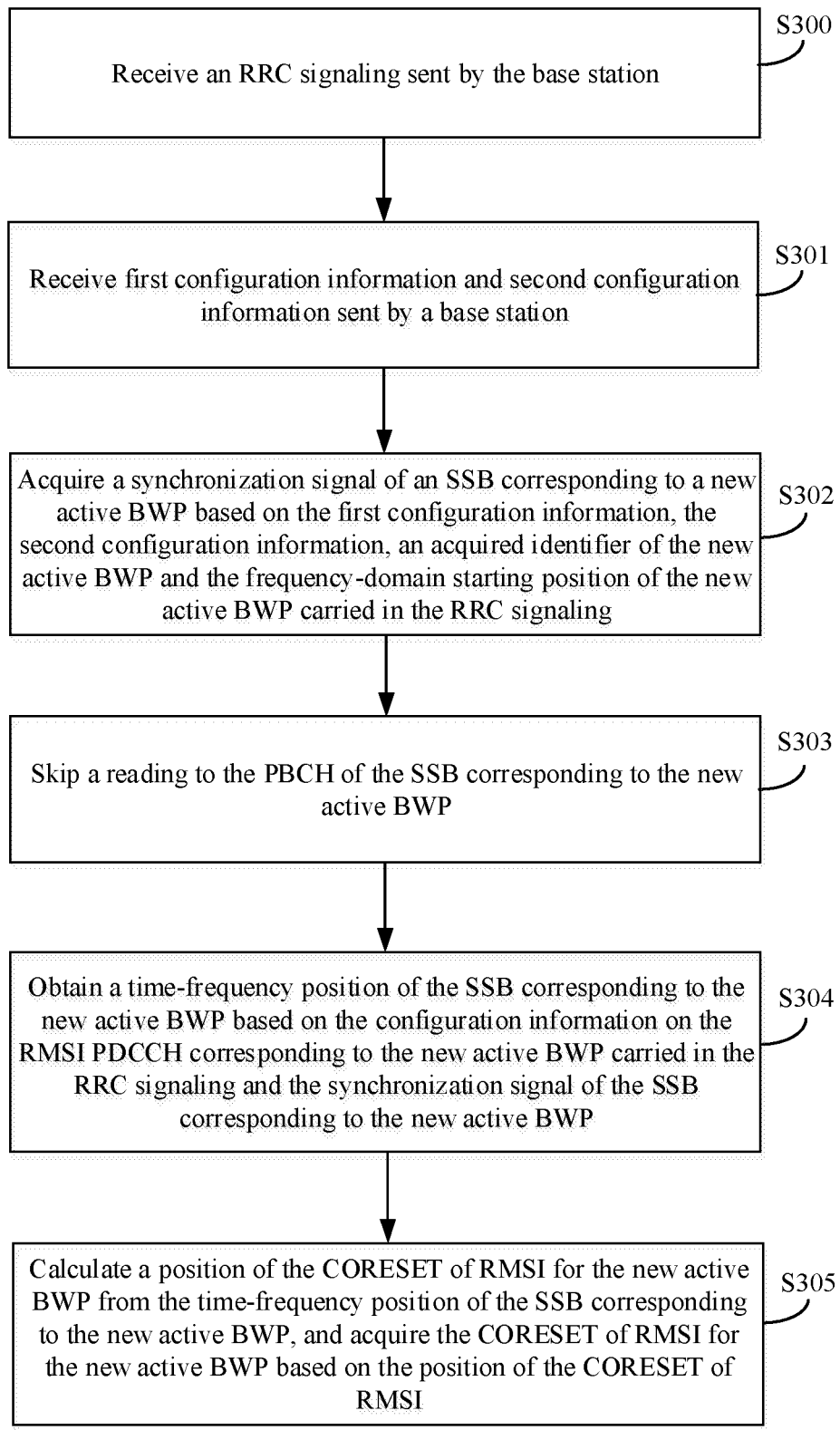
FIG. 4 is a flowchart illustrating another method for acquiring a CORESET of RMSI according to an exemplary embodiment of the present application.

FIG. 4 is a flowchart illustrating another method for acquiring a CORESET of RMSI according to an exemplary embodiment of the present application. As shown in FIG. 4, the method further includes step S300.

At step S300, an RRC signaling sent by the base station is received. The RRC signaling carries the frequency-domain starting position of each BWP and the index information of each SSB which have been configured.

Here, there is no strict execution order between step S300 and step S301.

In the above embodiment, by receiving the RRC signaling sent by the base station, the CORESET of RMSI for the new active BWP may be acquired based on the information such as the RRC signaling, the first configuration information, the second configuration information, and so on.

Figure 5:
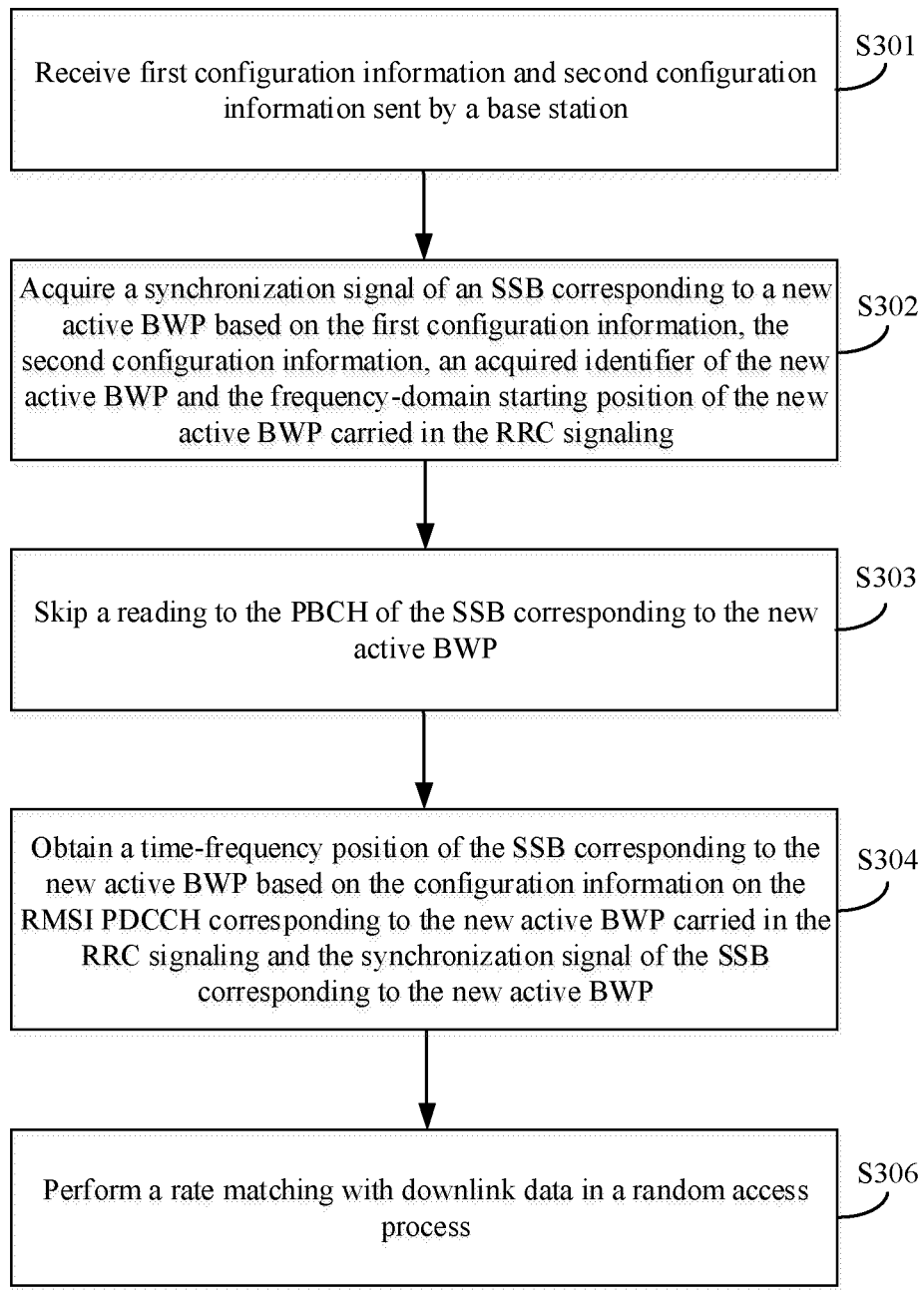
FIG. 5 is a flowchart illustrating another method for acquiring a CORESET of RMSI according to an exemplary embodiment of the present application.

FIG. 5 is a flowchart illustrating another method for acquiring a CORESET of RMSI according to an exemplary embodiment of the present application. As shown in FIG. 5, following step S304, the method further includes step S306.

At step S306, a rate matching is performed with downlink data in a random access process.

In the above embodiment, in response to obtaining the time-frequency position of the SSB corresponding to the new active BWP d, the rate matching can be performed with the downlink data in the random access process, so as to avoid errors caused by obtaining an incorrect time-frequency position of the SSB.

Figure 6:
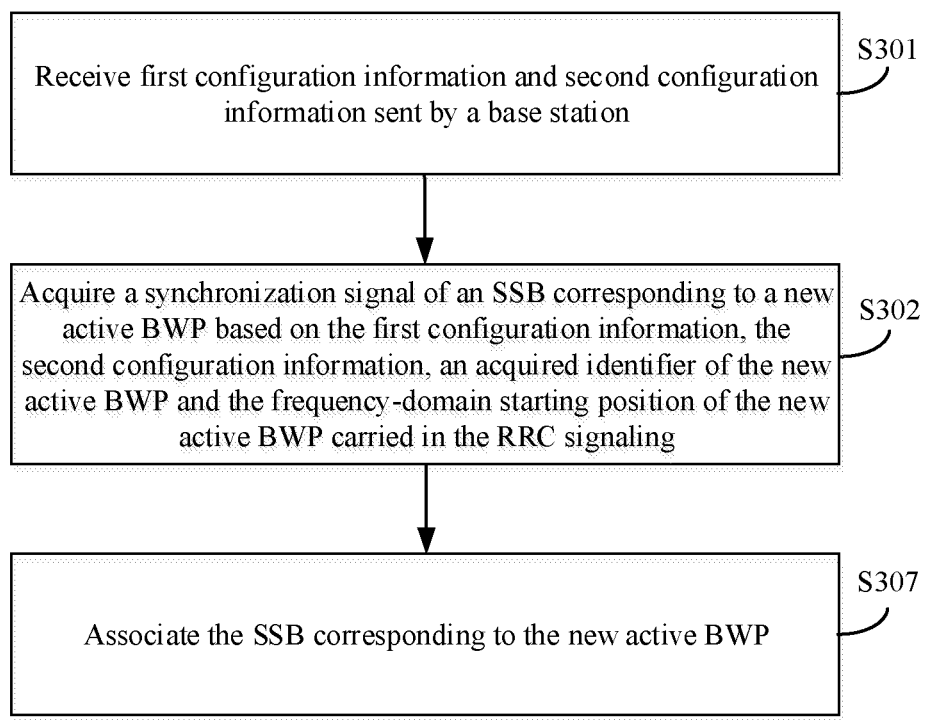
FIG. 6 is a flowchart illustrating another method for acquiring a CORESET of RMSI according to an exemplary embodiment of the present application.

FIG. 6 is a flowchart illustrating another method for acquiring a CORESET of RMSI according to an exemplary embodiment of the present application. As shown in FIG. 6, following step S302, the method further includes step S307.

At step S307, the SSB corresponding to the new active BWP is associated.

Here, the UE can associate the SSB corresponding to the new active BWP in response to completing the operations on the new active BWP.

In the above embodiment, by associating the SSB corresponding to the new active BWP, the UE can perform related operations on the basis of the SSB corresponding to the new active BWP.

Figure 7:
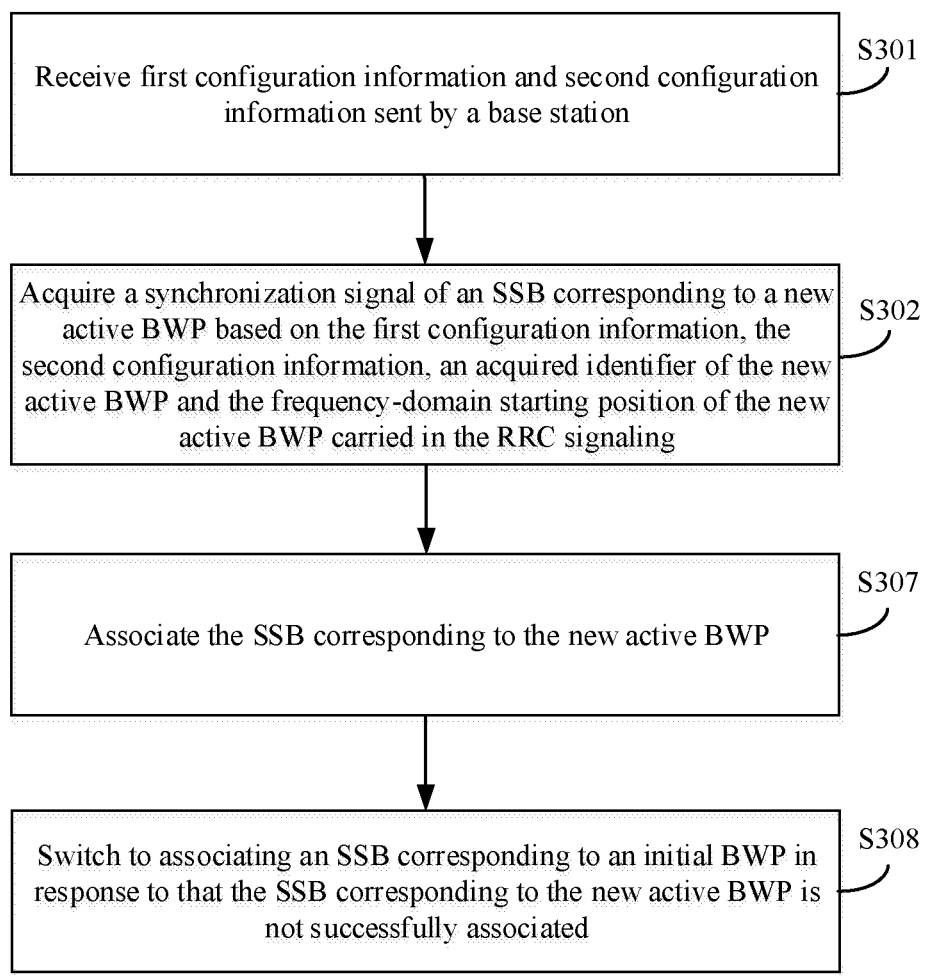
FIG. 7 is a flowchart illustrating another method for acquiring a CORESET of RMSI according to an exemplary embodiment of the present application.

FIG. 7 is a flowchart illustrating another method for acquiring a CORESET of RMSI according to an exemplary embodiment of the present application. As shown in FIG. 7, following step S307, the method further includes step S308.

At step S308, in response to that the SSB corresponding to the new active BWP is not successfully associated, an SSB corresponding to an initial BWP is switched to being associated.

In the above embodiment, when the SSB corresponding to the new active BWP is not successfully associated, the SSB corresponding to the initial BWP can be switched to being associated, so that the UE can be associated with one SSB, thereby providing conditions for subsequent related operations on the basis of the associated SSB.

Figure 8:
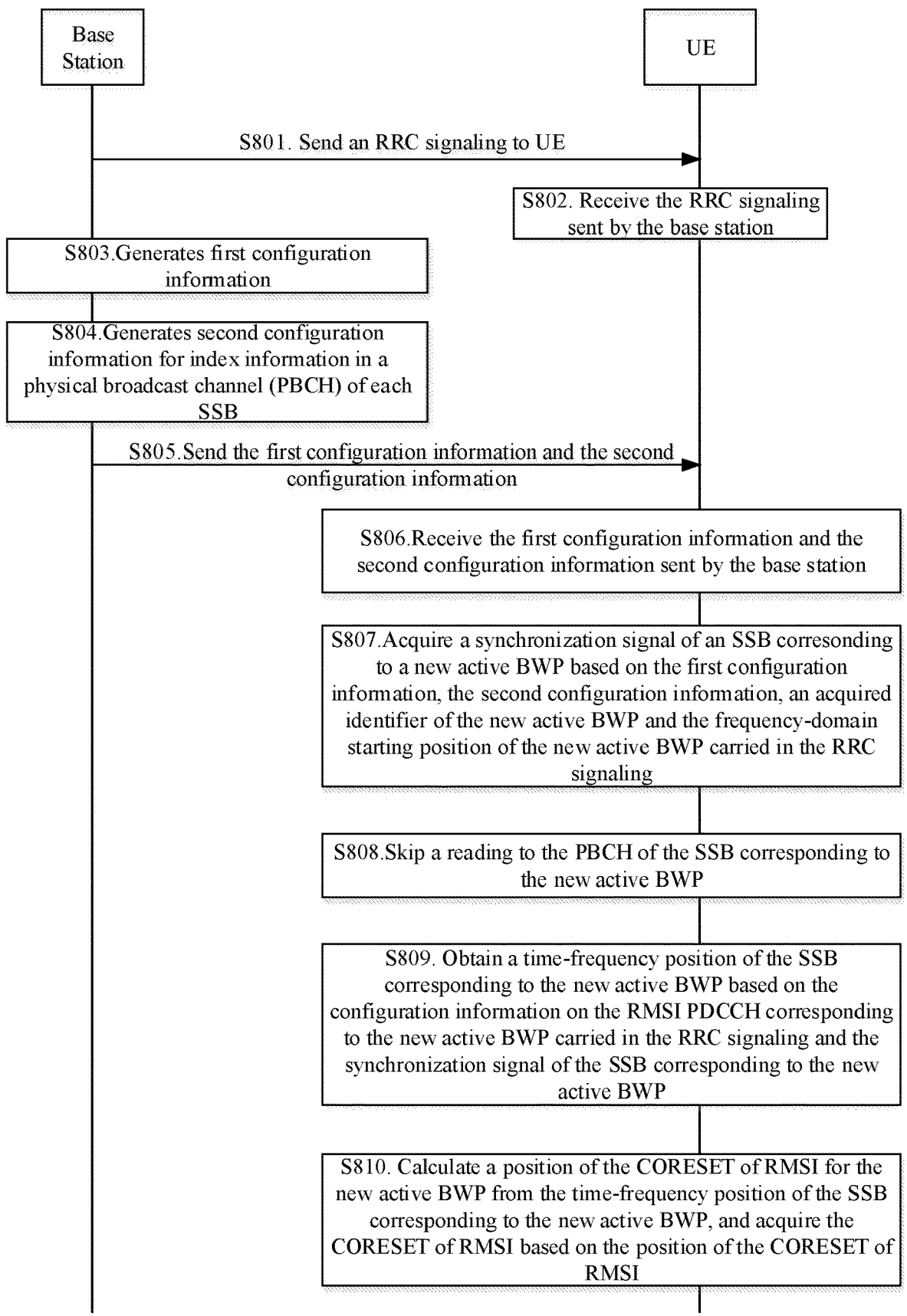
FIG. 8 is a signaling flowchart illustrating a method for acquiring a CORESET of RMSI according to an exemplary embodiment of the present application.

FIG. 8 is a signaling flowchart illustrating another method for acquiring a CORESET of RMSI according to an exemplary embodiment of the present application. This embodiment is described from the perspective of interaction between a base station and a UE. As shown in FIG. 8, the method includes steps S801~S810.

At step S801, the base station sends an RRC signaling to the UE. The RRC signaling carries a frequency-domain starting position of each BWP and index information of each SSB which have been configured.

At step S802, the UE receives the RRC signaling sent by the base station.

At step S803, the base station generates first configuration information. The first configuration information is configured in a radio resource control (RRC) signaling and indicates, for each bandwidth part (BWP), a relative position from a frequency-domain starting position of a synchronization broadcast block (SSB) corresponding to the BWP to a frequency-domain starting position of the BWP.

At step S804, the base station generates second configuration information for index information in a physical broadcast channel (PBCH) of each SSB. The second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located.

At step S805, the base station sends the first configuration information and the second configuration information to the UE through the RRC signaling.

At step S806, the UE receives the first configuration information and the second configuration information sent by the base station.

At step S807, the UE acquires a synchronization signal of an SSB corresponding to a new active BWP based on the first configuration information, the second configuration information, an acquired identifier of the new active BWP, and the frequency-domain starting position of the new active BWP carried in the RRC signaling.

At step S808, the UE skips a reading to the PBCH of the SSB corresponding to the new active BWP.

At step S809, the UE obtains a time-frequency position of the SSB corresponding to the new active BWP based on the configuration information on the RMSI PDCCH corresponding to the new active BWP carried in the RRC signaling and the synchronization signal of the SSB corresponding to the new active BWP.

At step S810, the UE calculates a position of the CORESET of RMSI for the new active BWP from the time-frequency position of the SSB corresponding to the new active BWP, and acquires the CORESET of RMSI based on the position of the CORESET of RMSI.

In the above embodiment, via the interaction between the base station and the UE, the base station generates and sends the first configuration information and the second configuration information to the UE, so that the UE is enabled to acquire the CORESET of RMSI for the new active BWP from the information including the first configuration information and the second configuration information, without reading the PBCH of the SSB corresponding to the new active BWP, thereby reducing the time-delay caused by acquiring the CORESET of RMSI for the new active BWP.

Figure 9A:
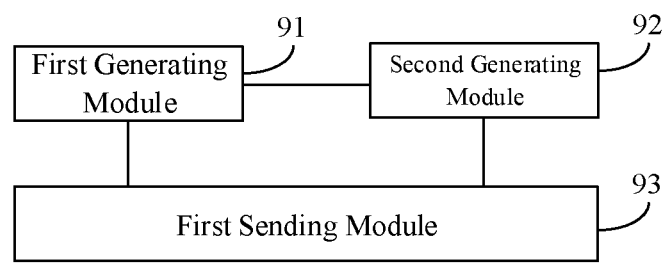
FIG. 9A is a block diagram illustrating an apparatus for configuring information according to an exemplary embodiment.

FIG. 9A is a block diagram illustrating an apparatus for configuring information according to an exemplary embodiment. The apparatus may be disposed in a base station. As shown in FIG. 9A, the apparatus includes: a first generating module 91, a second generating module 92, and a first sending module 93.

The first generating module 91 is configured to generate first configuration information to be configured in a radio resource control (RRC) signaling. The first configuration information indicates, for each bandwidth part (BWP), a relative position from a frequency-domain starting position of a synchronization broadcast block (SSB) for the BWP to a frequency-domain starting position of the BWP.

Here, SSB refers to a synchronization signal block or a physical broadcast channel block.

When a CORESET of RMSI for a BWP is not configured directly by the base station, the base station may generate the first configuration information, and the first configuration information is configured in an RRC signaling and indicates, for each BWP, a relative position from a frequency-domain starting position of an SSB corresponding to the BWP to a frequency-domain starting position of the BWP.

The second generating module 92 is configured to generate second configuration information for index information in a physical broadcast channel (PBCH) of each SSB. The second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located.

Here, the first configuration information and the second configuration information may be configured into the same configuration information.

The first sending module 93 is configured to send the first configuration information generated by the first generating module 91 and the second configuration information generated by the second generating module 92 to user equipment (UE) through the RRC signaling.

In the above embodiment, by generating and sending the first configuration information and the second configuration information to the UE, the UE is enabled to acquire a CORESET of RMSI for a new active BWP from information including the first configuration information and the second configuration information, without reading the physical broadcast channel (PBCH) of the SSB corresponding to the new active BWP, thereby reducing the time-delay caused by acquiring the CORESET of RMSI for the new active BWP.

Figure 9B:
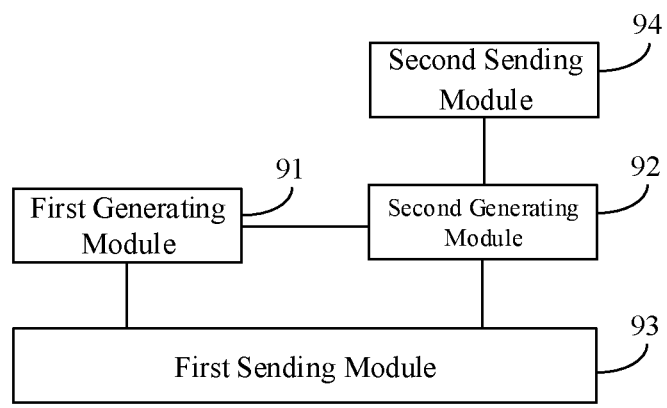
FIG. 9B is a block diagram illustrating another apparatus for configuring information according to an exemplary embodiment.

FIG. 9B is a block diagram illustrating another apparatus for configuring information according to an exemplary embodiment. As shown in FIG. 9B, based on the embodiment shown in FIG. 9A, the apparatus may further include: a second sending module 94.

The second sending module 94 is configured to send an RRC signaling to the UE. The RRC signaling carries the frequency-domain starting position of each BWP and the index information of each SSB which have been configured. For the index information of each SSB, the second generating module 92 generates the second configuration information.

In the above embodiment, by sending the RRC signaling to the UE, the UE is enabled to acquire the CORESET of RMSI for the new active BWP based on the RRC signaling in combination with the first configuration information and the second configuration information.

Figure 10A:
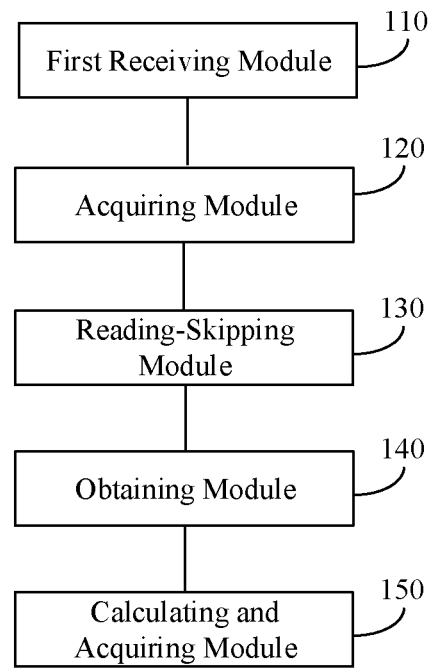
FIG. 10A is a block diagram illustrating an apparatus for acquiring a CORESET of RMSI according to an exemplary embodiment.

FIG. 10A is a block diagram illustrating an apparatus for acquiring a CORESET of RMSI according to an exemplary embodiment. The apparatus can be disposed in a UE. As shown in FIG. 10A, the apparatus includes: a first receiving module 110, an acquiring module 120, a reading-skipping module 130, an obtaining module 140, and a calculating and acquiring module 150.

The first receiving module 110 is configured to receive first configuration information and second configuration information sent by a base station. The first configuration information is configured in an RRC signaling and indicates, for each BWP, a relative position from a frequency-domain starting position of a synchronization broadcast block (SSB) corresponding to the BWP to a frequency-domain starting position of the BWP. The second configuration information is generated for index information in a physical broadcast channel (PBCH) of each SSB, where the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located.

The acquiring module 120 is configured to acquire a synchronization signal of an SSB corresponding to a new active BWP based on the first configuration information and the second configuration information which are received by the first receiving module 110, an acquired identifier of the new active BWP, and the frequency-domain starting position of the new active BWP carried in the RRC signaling.

Here, the UE may acquire the identifier of the new active BWP from a physical layer signaling.

The reading-skipping module 130 is configured to skip a reading to the PBCH of the SSB corresponding to the new active BWP.

In this embodiment, the reading to the PBCH of the SSB corresponding to the new active BWP is skipped, that is, it is not necessary to read the PBCH of the SSB corresponding to the new active BWP, thereby reducing the time-delay caused by acquiring the CORESET of RMSI.

The obtaining module 140 is configured to obtain a time-frequency position of the SSB corresponding to the new active BWP based on the configuration information on the RMSI PDCCH corresponding to the new active BWP carried in the RRC signaling and the synchronization signal of the SSB corresponding to the new active BWP acquired by the acquiring module 120.

The calculating and acquiring module 150 is configured to calculate a position of the CORESET of RMSI for the new active BWP from the time-frequency position of the SSB corresponding to the new active BWP which is obtained by the obtaining module 140, and acquire the CORESET of RMSI for the new active BWP based on the position of the CORESET of RMSI.

In the above embodiment, by receiving the first configuration information and the second configuration information sent by the base station, the synchronization signal of the SSB corresponding to the new active BWP may be acquired based on the first configuration information, the second configuration information, the acquired identifier of the new active BWP, and the frequency-domain starting position of the new active BWP carried in the RRC signaling, while the reading to the PBCH of the SSB corresponding to the new active BWP is skipped, that is, it is not necessary to read the PBCH of the SSB corresponding to the new active BWP, thereby reducing the time-delay caused by acquiring the CORESET of RMSI for the new active BWP.

Figure 10B:
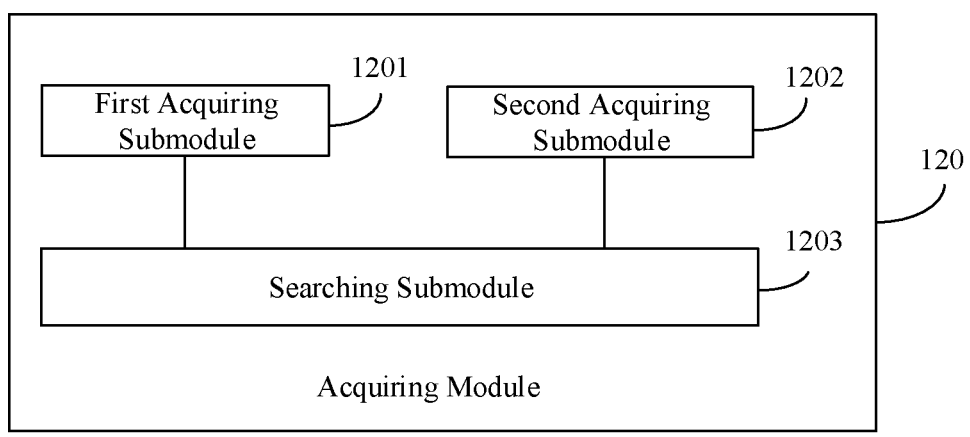
FIG. 10B is a block diagram illustrating another apparatus for acquiring a CORESET of RMSI according to an exemplary embodiment.

FIG. 10B is a block diagram illustrating another apparatus for acquiring a CORESET of RMSI according to an exemplary embodiment. As shown in FIG. 10B, on the basis of the embodiment shown in FIG. 10A, the acquiring module 120 may include: a first acquiring submodule 1201, a second acquiring submodule 1202 and a searching submodule 1203.

The first acquiring submodule 1201 is configured to acquire frequency-domain information on the SSB corresponding to the new active BWP based on the first configuration information, the identifier of the new active BWP, and the frequency-domain starting position of the new active BWP.

The second acquiring submodule 1202 is configured to acquire time-domain information of the SSB corresponding to the new active BWP based on the second configuration information and the identifier of the new active BWP.

The searching submodule 1203 is configured to obtain the synchronization signal by searching the new active BWP based on the time-domain information acquired by the first acquiring submodule 1201 and the frequency-domain information acquired by the second acquiring submodule 1202.

In the above embodiment, by acquiring frequency-domain information and time-domain information of the SSB corresponding to the new active BWP, and searching for the synchronization signal for the new active BWP based on the acquired time-domain information and frequency-domain information, it is easy to implement.

Figure 10C:
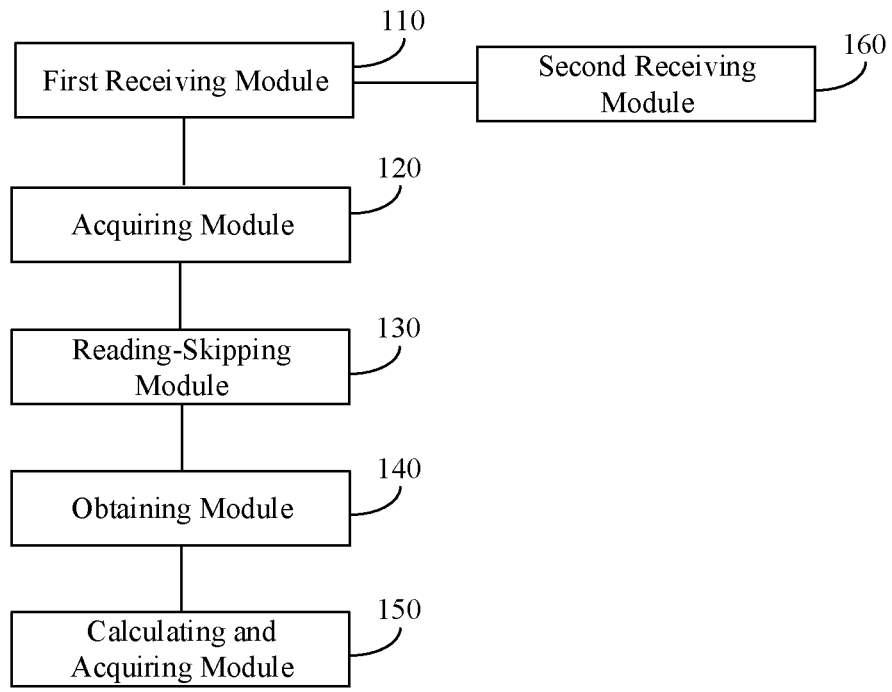
FIG. 10C is a block diagram illustrating another apparatus for acquiring a CORESET of RMSI according to an exemplary embodiment.

FIG. 10C is a block diagram illustrating another apparatus for acquiring a CORESET of RMSI according to an exemplary embodiment. As shown in FIG. 10C, on the basis of the embodiment shown in FIG. 10A, the apparatus may further include: a second receiving module 160.

The second receiving module 160 is configured to receive an RRC signaling sent by the base station. The RRC signaling carries the frequency-domain starting position of each BWP and the index information of each SSB which have been configured. For the index information of each SSB, the second configuration information received by the first receiving module 110 is generated.

In the above embodiment, by receiving the RRC signaling sent by the base station, the CORESET of RMSI for the new active BWP may be acquired based on the information such as the RRC signaling, the first configuration information, the second configuration information, and so on.

Figure 10D:
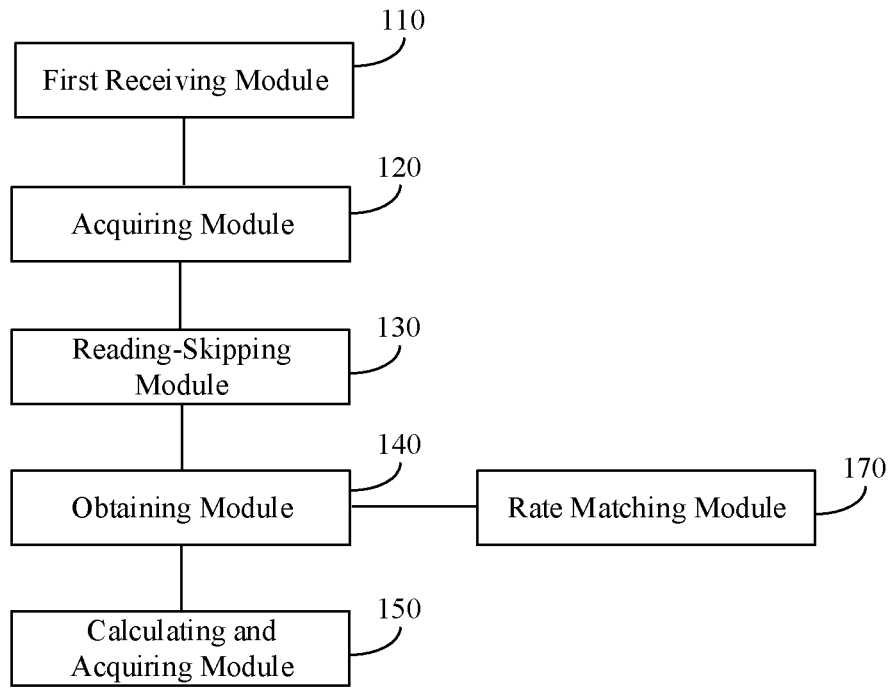
FIG. 10D is a block diagram illustrating another apparatus for acquiring a CORESET of RMSI according to an exemplary embodiment.

FIG. 10D is a block diagram illustrating another apparatus for acquiring a CORESET of RMSI according to an exemplary embodiment. As shown in FIG. 10D, on the basis of the embodiment shown in FIG. 10A, the apparatus may further include: a rate matching module 170.

The rate matching module 170 is configured to perform a rate matching with downlink data in a random access process in response to that the obtaining module 140 obtains the time-frequency position of the SSB corresponding to the new active BWP.

In the above embodiment, in response to obtaining the time-frequency position of the SSB corresponding to the new active BWP, the rate matching can be performed with the downlink data in the random access process, so as to avoid errors caused by obtaining an incorrect time-frequency position of the SSB.

Figure 10E:
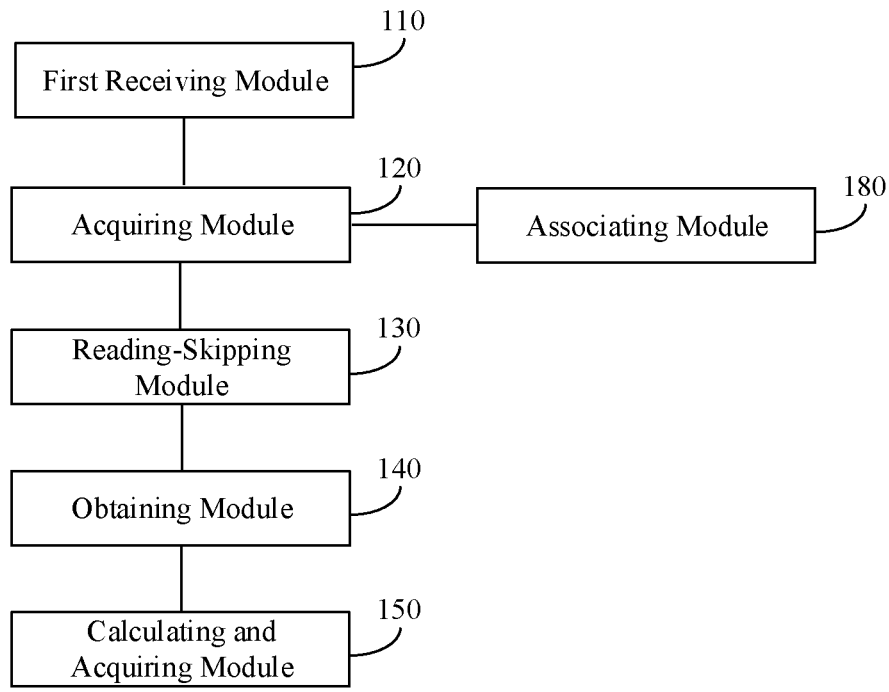
FIG. 10E is a block diagram illustrating another apparatus for acquiring a CORESET of RMSI according to an exemplary embodiment.

FIG. 10E is a block diagram illustrating another apparatus for acquiring a CORESET of RMSI according to an exemplary embodiment. As shown in FIG. 10E, on the basis of the embodiment shown in FIG. 10A, the apparatus may further include an associating module 180.

The associating module 180 is configured to associate the SSB corresponding to the new active BWP in response to that the acquiring module 120 acquires the synchronization signal of the SSB corresponding to the new active BWP.

Here, the UE can associate the SSB corresponding to the new active BWP in response to completing the operations on the new active BWP.

In the above embodiment, by associating the SSB corresponding to the new active BWP, the UE can perform related operations on the basis of the SSB corresponding to the new active BWP.

Figure 10F:
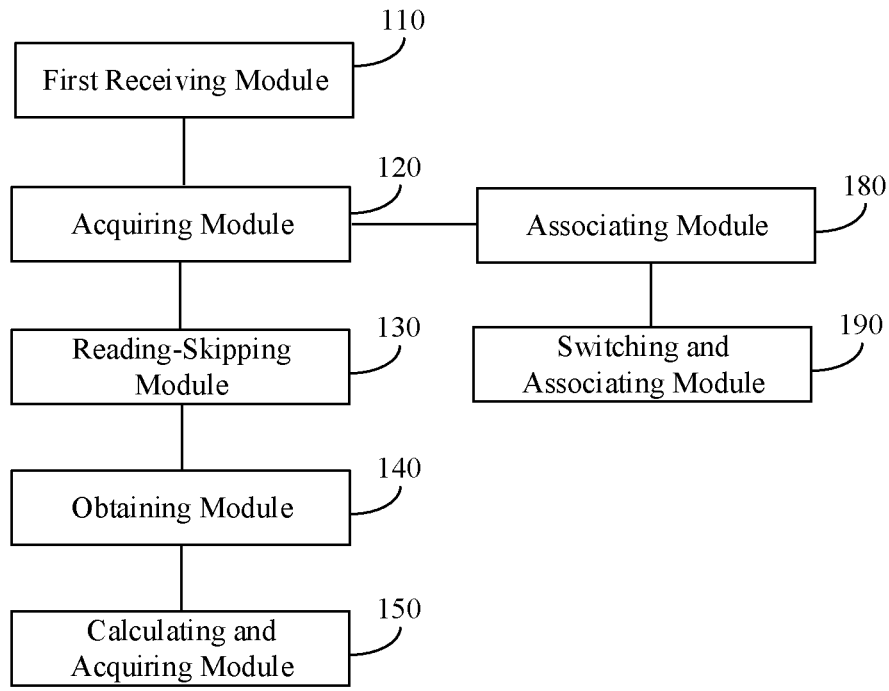
FIG. 10F is a block diagram illustrating another apparatus for acquiring a CORESET of RMSI according to an exemplary embodiment.

FIG. 10F is a block diagram illustrating another apparatus for acquiring a CORESET of RMSI according to an exemplary embodiment. As shown in FIG. 10F, on the basis of the embodiment shown in FIG. 10E, the apparatus may further include a switching and associating module 190.

The switching and associating module 190 is configured to switch to associating an SSB corresponding to the initial BWP in response to that the SSB corresponding to the new active BWP is not successfully associated by the associating module 180.

In the above embodiment, when the SSB corresponding to the new active BWP is not successfully associated, the SSB corresponding to the initial BWP can be switched to being associated, so that the UE can be associated with one SSB, thereby providing conditions for subsequent related operations on the basis of the associated SSB.

Figure 11:
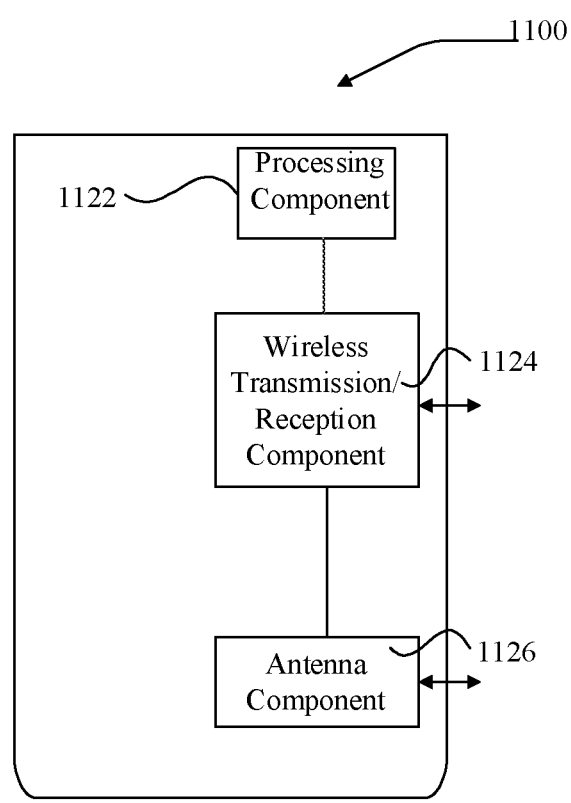
FIG. 11 is a block diagram applicable to an apparatus for configuring information illustrated according to an exemplary embodiment.

FIG. 11 is a block diagram applicable to an apparatus for configuring information illustrated according to an exemplary embodiment. The device 1100 may be a base station. Referring to FIG. 11, the device 1100 includes a processing component 1122, a wireless transmission/reception component 1124, an antenna component 1126, and a signal processing part unique to a wireless interface. The processing component 1122 may further include one or more processors.

One of the processors of the processing component 1122 may be configured to:

generate first configuration information to be configured in a radio resource control (RRC) signaling, where the first configuration information indicates, for each bandwidth part (BWP), a relative position from a frequency-domain starting position of a synchronization broadcast block (SSB) corresponding to the BWP to a frequency-domain starting position of the BWP;

generate second configuration information for index information in a physical broadcast channel (PBCH) of each SSB, where the second configuration information includes a timing pattern, half-frame indication information, and configuration information on remaining minimum system information (RMSI) physical downlink control channel (PDCCH) for the SSB, and the half-frame indication information indicates an identifier of a half-frame of a current radio frame in which the SSB is located; and send the first configuration information and the second configuration information to user equipment (UE) through the RRC signaling.

In an exemplary embodiment, a non-transitory computer-readable storage medium including instructions is provided, the instructions may be executed by the processing component 1122 of the device 1100 to complete the method of configuring information. For example, the non-transitory computer-readable storage medium may be a Read-Only Memory (ROM), a random access memory (RAM), a CD-ROM, a magnetic tape, a floppy disk, an optical data storage device, or the like.

Figure 12:
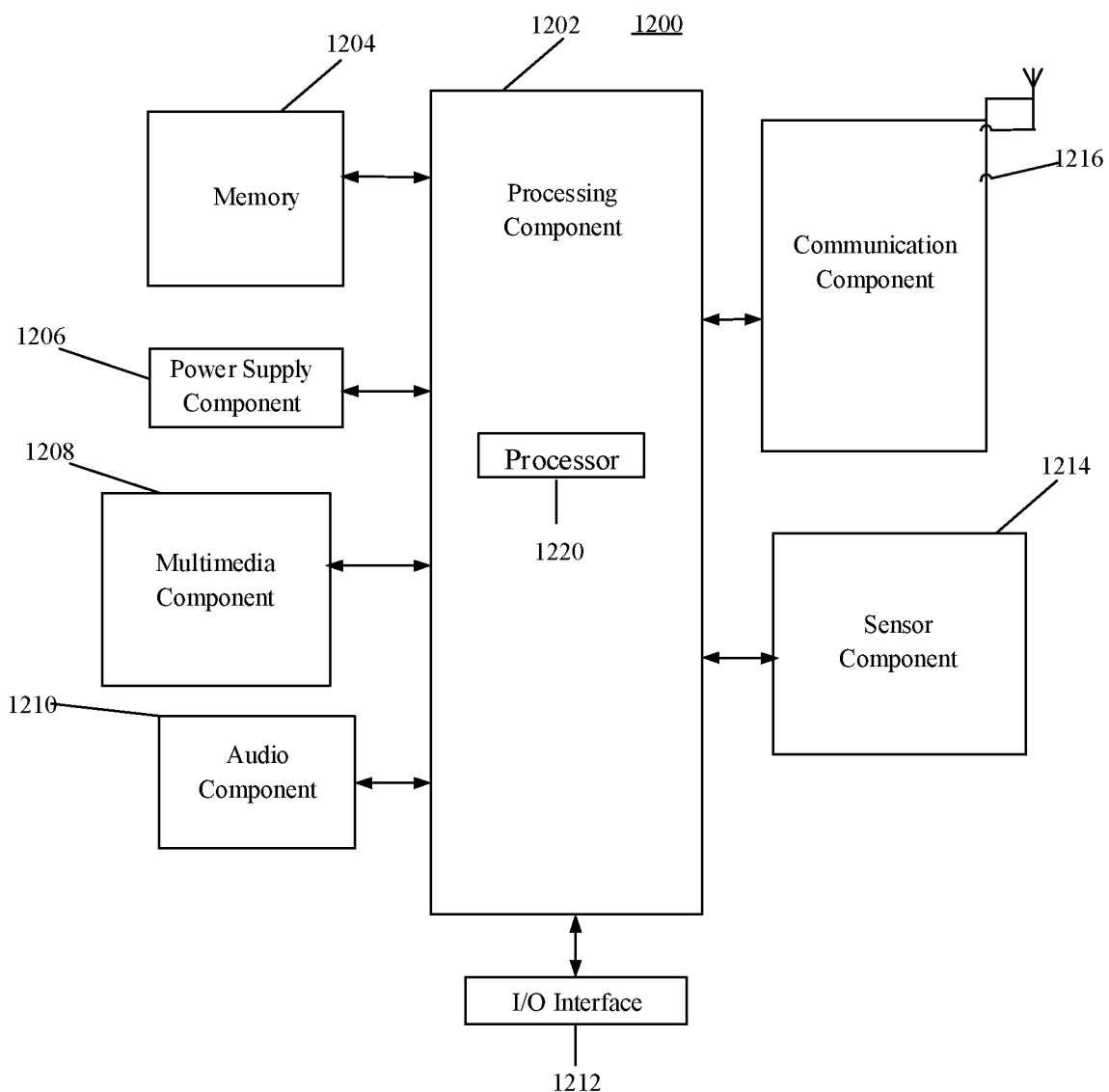
FIG. 12 is a block diagram applicable to an apparatus for acquiring a CORESET of RMSI illustrated according to an exemplary embodiment.

FIG. 12 is a block diagram applicable to an apparatus for acquiring a CORESET of RMSI illustrated according to an exemplary embodiment. For example, the device 1200 may be a mobile phone, a computer, a digital broadcasting terminal, a messaging device, a game console, a tablet device, a medical device, a fitness device, a personal digital assistant, or other user equipment.

As shown in FIG. 12, the device 1200 may include one or more of the following components: a processing component 1202, a memory 1204, a power supply component 1206, a multimedia component 1208, an audio component 1210, an input/output (I/O) interface 1212, a sensor component 1214, and a communication component 1216.

The processing component 1202 generally controls overall operations of the device 1200, such as operations associated with display, phone calls, data communications, camera operations, and recording operations. The processing component 1202 may include one or more processors 1220 to execute instructions to complete all or part of the steps of the above methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

One of the processors in the processing component 1202 may be configured to:

receive first configuration information and second configuration information sent by a base station, where the first configuration information is configured in a radio resource control (RRC) signaling and indicates, for each bandwidth part (BWP), a relative position from a frequency-domain starting position of a synchronization broadcast block (SSB) corresponding to the BWP to a frequency-domain starting position of the BWP, and the second configuration information is generated for index information in a physical broadcast channel (PBCH) of each SSB, in which the second configuration information includes a timing pattern, half-frame indication information, and configuration information on RMSI physical downlink control channel (PDCCH) for the SSB, and the half-frame indication information indicates an identifier of a half-frame of a current radio frame in which the SSB is located;

acquire a synchronization signal of an SSB corresponding to a new active BWP based on the first configuration information, the second configuration information, an acquired identifier of the new active BWP and the frequency-domain starting position of the new active BWP carried in the RRC signaling;

skip a reading to the PBCH of the SSB corresponding to the new active BWP;

obtain a time-frequency position of the SSB corresponding to the new active BWP based on the configuration information on the RMSI PDCCH corresponding to the new active BWP carried in the RRC signaling and the synchronization signal of the SSB corresponding to the new active BWP; and calculate a position of the CORESET of RMSI for the new active BWP from the time-frequency position of the SSB corresponding to the new active BWP, and acquire the CORESET of RMSI for the new active BWP based on the position of the CORESET of RMSI.

The memory 1204 is configured to store various types of data to support the operation of the device 1200. Examples of such data include instructions for any application or method operated on the device 1200, contact data, phone-book data, messages, pictures, videos, and so on. The memory 1204 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1206 supplies power for different components of the device 1200. The power supply component 1206 may include a power supply management system, one or more power supplies, and other components associated with generating, managing and distributing power for the device 1200.

The multimedia component 1208 includes a screen providing an output interface between the device 1200 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some embodiments, the multimedia component 1208 may include a front camera and/or a rear camera. The front camera and/or rear camera may receive external multimedia data when the device 1200 is in an operating mode, such as a photographing mode or a video mode. Each front camera and rear camera may be a fixed optical lens system or have focal length and optical zooming capability.

The audio component 1210 is configured to output and/or input an audio signal. For example, the audio component 1210 includes a microphone (MIC). When the device 1200 is in an operating mode, such as a call mode, a record mode and a voice recognition mode, the microphone is configured to receive an external audio signal. The received audio signal may be further stored in the memory 1204 or sent via the communication component 1216. In some embodiments, the audio component 1210 further includes a speaker for outputting an audio signal.

The I/O interface 1212 provides an interface between the processing component 1202 and a peripheral interface module. The above peripheral interface module may be a keyboard, a click wheel, buttons, or the like. These buttons may include but not limited to, a home button, a volume button, a start button and a lock button.

The sensor component 1214 includes one or more sensors to provide status assessments of various aspects for the device 1200. For example, the sensor component 1214 may detect the on/off status of the device 1200, and relative positioning of components, such as a display and a keypad of the device 1200. The sensor component 1214 may also detect a change in position of the device 1200 or a component of the device 1200, the presence or absence of user contact with the device 1200, orientation or acceleration/deceleration of the device 1200, and temperature change of the device 1200. The sensor component 1214 may include a proximity sensor configured to detect the presence of nearby objects without any physical contact. The sensor component 1214 may further include an optical sensor, such as a Complementary Metal-Oxide-Semiconductor (CMOS) or Charged Coupled Device (CCD) image sensor, for use in imaging applications. In some embodiments, the sensor component 1214 may further include an acceleration sensor, a gyroscope sensor, a magnetic sensor, a pressure sensor, or a temperature sensor.

The communication component 1216 is configured to facilitate wired or wireless communication between the device 1200 and other devices. The device 1200 may access a wireless network based on a communication standard, such as Wi-Fi, 2G or 3G, or a combination thereof. In an exemplary embodiment, the communication component 1216 receives broadcast signals or broadcast related information from an external broadcast management system via a broadcast channel. In one exemplary embodiment, the communication component 1216 may further include a Near Field Communication (NFC) module for facilitate short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the above methods.

In an exemplary embodiment, there is also provided a non-transitory computer-readable storage medium including instructions, such as the memory 1204 including instructions executable by the processor 1220 of the device 1200 to implement the above method. For example, the non-transitory computer-readable storage medium may be a ROM, a Random Access Memory (RAM), a CD-ROM, a magnetic tape, a floppy disk, an optical data storage device, and so on.

Since the apparatus embodiments essentially correspond to the method embodiments, reference may be made to the description of related parts of the method embodiments. The apparatus embodiments described above are merely illustrative, wherein the units described as separate components may or may not be physically separated, and the components displayed as units may or may not be physical units, that is, may be located in one place or distributed to multiple units in a network. Some or all of the modules may be selected according to actual needs to achieve the objectives of the present disclosure. It can be understood and implemented by those of ordinary skill in the art without any creative effort.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the elements.

Other implementations of the present disclosure will be readily apparent to those skilled in the art after implementing the disclosure by referring to the specification. The present application is intended to cover any variations, uses, or adaptations of the present disclosure which are in accordance with the general principles of the present disclosure and include common general knowledge or conventional technical means in the art that are not disclosed in the present disclosure. The specification and examples therein are only illustrative, and the scope and spirit of the present disclosure are to be indicated by appended claims.

It should be understood that the present disclosure is not limited to the above described accurate structures shown in the drawings, and various modifications and changes can be made to the present disclosure without departing from the scope thereof. The scope of the present disclosure is to be limited only by the appended claims.

The invention claimed is:

1. A method of configuring information, applicable to a base station, the method comprising:
    generating first configuration information to be configured in a radio resource control (RRC) signaling, wherein the first configuration information indicates, for a bandwidth part (BWP), a relative position from a frequency-domain starting position of a synchronization broadcast block (SSB) corresponding to the BWP to a frequency-domain starting position of the BWP;
    generating second configuration information for index information in a physical broadcast channel (PBCH) of the SSB corresponding to the BWP, wherein the second configuration information comprises a timing pattern, half-frame indication information, and configuration information on remaining minimum system information (RMSI) physical downlink control channel (PDCCH) for the SSB, and the half-frame indication information indicates an identifier of a half-frame of a current radio frame carrying the SSB; and
    sending the first configuration information and the second configuration information to user equipment (UE) through the RRC signaling.

2. The method according to claim 1, further comprising:
    sending, to the UE, the RRC signaling that carries the frequency-domain starting position of the BWP and the index information of the SSB.

3. A method of acquiring a common control resource set (CORESET) of remaining minimum system information (RMSI), applicable to user equipment (UE), the method comprising:
receiving first configuration information and second configuration information sent by a base station, wherein
the first configuration information is configured in a radio resource control (RRC) signaling and indicates, for a bandwidth part (BWP), a relative position from a frequency-domain starting position of a synchronization broadcast block (SSB) corresponding to the BWP to a frequency-domain starting position of the BWP, and
the second configuration information is generated for index information in a physical broadcast channel (PBCH) of the SSB corresponding to the BWP, wherein the second configuration information comprises a timing pattern, half-frame indication information, and configuration information on RMSI physical downlink control channel (PDCCH) for the SSB, and the half-frame indication information indicates an identifier of a half-frame of a current radio frame carrying the SSB;
acquiring a synchronization signal of an SSB corresponding to a new active BWP based on the first configuration information, the second configuration information, an acquired identifier of the new active BWP and the frequency-domain starting position of the new active BWP carried in the RRC signaling;
skipping a reading to the PBCH of the SSB corresponding to the new active BWP;
obtaining a time-frequency position of the SSB corresponding to the new active BWP based on the configuration information on the RMSI PDCCH corresponding to the new active BWP carried in the RRC signaling and the synchronization signal of the SSB corresponding to the new active BWP;
calculating a position of the CORESET of RMSI for the new active BWP from the time-frequency position of the SSB corresponding to the new active BWP; and
acquiring the CORESET of RMSI for the new active BWP based on the position of the CORESET of RMSI.

4. The method according to claim 3, wherein the acquiring the synchronization signal of the SSB corresponding to the new active BWP based on the first configuration information, the second configuration information, the acquired identifier of the new active BWP and the frequency-domain starting position of the new active BWP carried in the RRC signaling comprises:
acquiring frequency-domain information of the SSB corresponding to the new active BWP based on the first configuration information, the identifier of the new active BWP, and the frequency-domain starting position of the new active BWP;
acquiring time-domain information of the SSB corresponding to the new active BWP based on the second configuration information and the identifier of the new active BWP; and
obtaining the synchronization signal by searching the new active BWP based on the time-domain information and the frequency-domain information.

5. The method according to claim 3, further comprising:
receiving, from the base station, the RRC signaling that carries the frequency-domain starting position of the BWP and the index information of the SSB.

6. The method according to claim 3, further comprising:
performing a rate matching with downlink data in a random access process in response to obtaining the time-frequency position of the SSB corresponding to the new active BWP.

7. The method according to claim 3, further comprising:
associating the SSB corresponding to the new active BWP in response to acquiring the synchronization signal of the SSB corresponding to the new active BWP.

8. The method according to claim 7, further comprising:
switching to associating an SSB corresponding to an initial BWP in response to that the SSB corresponding to the new active BWP is not successfully associated.

9. A base station, comprising:
a processor; and
a memory for storing executable instructions by the processor,
wherein the processor is configured to implement the steps of the method of configuring information according to claim 1.

10. User equipment, comprising:
a processor; and
a memory for storing executable instructions by the processor,
wherein the processor is configured to:
receive first configuration information and second configuration information sent by a base station, wherein
the first configuration information is configured in a radio resource control (RRC) signaling and indicates, for a bandwidth part (BWP), a relative position from a frequency-domain starting position of a synchronization broadcast block (SSB) corresponding to the BWP to a frequency-domain starting position of the BWP, and
the second configuration information is generated for index information in a physical broadcast channel (PBCH) of the SSB corresponding to the BWP, wherein the second configuration information comprises a timing pattern, half-frame indication information, and configuration information on RMSI physical downlink control channel (PDCCH) for the SSB, and the half-frame indication information indicates an identifier of a half-frame of a current radio frame carrying the SSB;
acquire a synchronization signal of an SSB corresponding to a new active BWP based on the first configuration information, the second configuration information, an acquired identifier of the new active BWP and the frequency-domain starting position of the new active BWP carried in the RRC signaling;
skip a reading to the PBCH of the SSB corresponding to the new active BWP;
obtain a time-frequency position of the SSB corresponding to the new active BWP based on the configuration information on the RMSI PDCCH corresponding to the new active BWP carried in the RRC signaling and the synchronization signal of the SSB corresponding to the new active BWP;
calculate a position of the CORESET of RMSI for the new active BWP from the time-frequency position of the SSB corresponding to the new active BWP; and
acquire the CORESET of RMSI for the new active BWP based on the position of the CORESET of RMSI.

11. The user equipment according to claim 10, wherein when acquiring the synchronization signal of the SSB corresponding to the new active BWP based on the first configuration information, the second configuration information, the acquired identifier of the new active BWP and the frequency-domain starting position of the new active BWP carried in the RRC signaling, the processor is configured to:

acquire frequency-domain information of the SSB corresponding to the new active BWP based on the first configuration information, the identifier of the new active BWP, and the frequency-domain starting position of the new active BWP;

acquire time-domain information of the SSB corresponding to the new active BWP based on the second configuration information and the identifier of the new active BWP; and obtain the synchronization signal by searching the new active BWP based on the time-domain information and the frequency-domain information.

12. The user equipment according to claim 10, wherein the processor is further configured to:

receive, from the base station, the RRC signaling that carries the frequency-domain starting position of the BWP and the index information of the SSB.

13. The user equipment according to claim 10, wherein the processor is further configured to:

perform a rate matching with downlink data in a random access process in response to obtaining the time-frequency position of the SSB corresponding to the new active BWP.

14. The user equipment according to claim 10, wherein the processor is further configured to:

associate the SSB corresponding to the new active BWP in response to acquiring the synchronization signal of the SSB corresponding to the new active BWP.

15. The user equipment according to claim 14, wherein the processor is further configured to:

switch to associating an SSB corresponding to an initial BWP in response to that the SSB corresponding to the new active BWP is not successfully associated.

16. A non-transitory computer-readable storage medium having computer instructions stored thereon, wherein when the instructions are executed by a processor, the steps of the method of configuring information according to claim 1 are performed.

17. A non-transitory computer-readable storage medium having computer instructions stored thereon, wherein when the instructions are executed by a processor, the steps of the method for acquiring a common control resource set (CORESET) of remaining minimum system information (RMSI) according to claim 3 are performed.

\* \* \* \* \*